Jan. 4, 1927.  1,613,533
C. E. PRINCE
MECHANISM FOR CONVERTING OSCILLATING MOVEMENT INTO A STEP-BY-STEP ROTATIONAL
MOVEMENT PARTICULARLY APPLICABLE TO ELECTRICALLY DRIVEN INDICATORS
Filed August 9, 1924
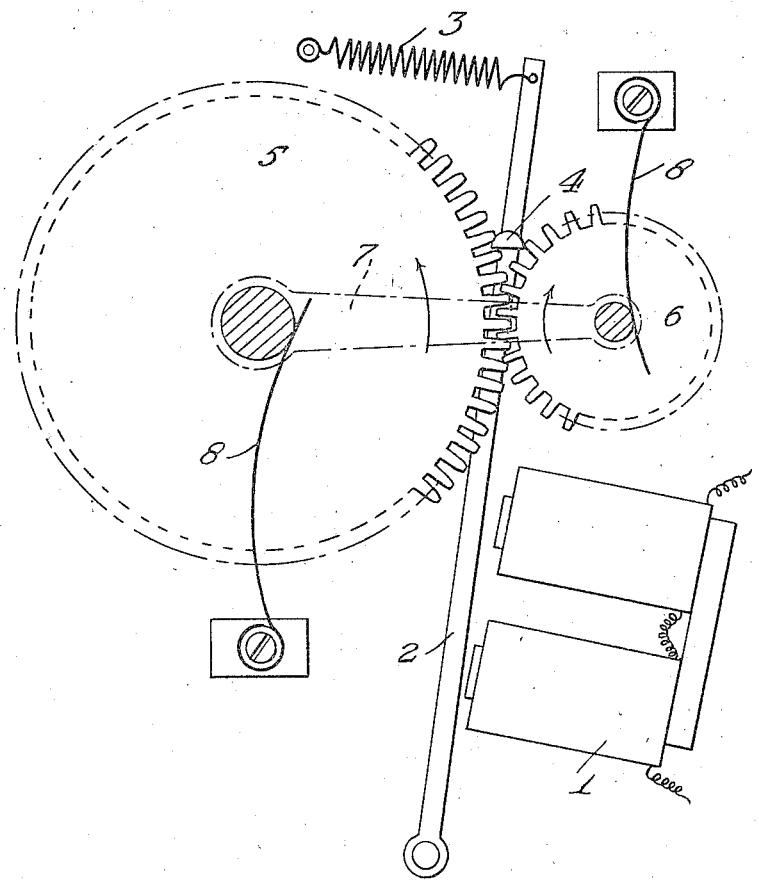
Inventor
Charles E. Prince
By
Attorney Patented Jan. 4, 1927.

1,613,533

UNITED STATES PATENT OFFICE.

CHARLES EDMOND PRINCE, OF BURCHETTS GREEN, ENGLAND.

MECHANISM FOR CONVERTING OSCILLATING MOVEMENT INTO A STEP-BY-STEP ROTATIONAL MOVEMENT PARTICULARLY APPLICABLE TO ELECTRICALLY-DRIVEN INDICATORS.

Application filed August 9, 1924, Serial No. 731,180, and in Great Britain October 9, 1923.

This invention relates to mechanism for converting an oscillating movement into a step-by-step rotational movement, and while particularly applicable to electrically driven indicators such as the time-indicating mechanism of electrical clocks or other indicating mechanism in which an electromagnetic device is periodically energized to cause an oscillating movement which is converted into a step-by-step rotational movement of a wheel or train of wheels, it is to be understood that the invention is not limited to apparatus in which the oscillating element is electrically driven.

According to the invention the armature of an electromagnet or equivalent oscillating member, whether electrically actuated or not, carries a pallet which cooperates not only with a toothed wheel of the train to be driven, but also with a second toothed wheel meshing therewith and acting as a continuous rotary lock for the train. The pallet, which may consist simply of a suitably shaped pin projecting from the oscillating element, engages alternately with the teeth of the two meshing wheels and at each engagement rotates them forwardly through an angle equivalent to half a tooth.

The invention is illustrated in the accompanying drawing with reference to an apparatus in which the oscillating element is electrically driven.

The electromagnet 1 therein shown is energized intermittently, e. g. upon each swing of a pendulum, not shown in the drawing, and upon being so energized attracts an armature 2 against the reaction of a spring 3. This armature or an extension thereof carries a projecting pin 4 which is adapted to engage alternately with the teeth of two wheels 5, 6 in mesh with each other, one of these wheels, say 5, being for example a member of a train of wheels which drive the hands of a clock. The pin or pallet 4 is suitably cam-formed on its working face so that when, for example, the armature 2 is attracted by the magnet 1 this operating cam face engages a tooth of the wheel 6 and shifts the latter in the direction shown by the arrow through an angle corresponding with half the pitch of its teeth. The wheel 5 being permanently in mesh with the wheel 6 will simultaneously be shifted through half a tooth. Upon the return of the armature 2 by the spring 3 the pallet 4 engages the next tooth of the wheel 5, shifting it through an angle represented by half the pitch of its teeth and consequently also shifting wheel 6 correspondingly. Thus, for each double oscillation of the armature the wheel 5 will be moved through an angle equal to the pitch of its teeth.

With a suitably shaped pin or pallet 4, e. g. one which is cylindrical on its driving face and flat on its rear face, in appropriate relation with the teeth of the two intermeshing wheels 5, 6 an unfailing forward movement of the wheels in accordance with the oscillations of the armature or the like is assured and any possibility of backward movement of the wheels by reason of vibration or any other cause is prevented.

The relation of pallet 4 to the teeth of the wheels may be adjusted by mounting the pallet on the armature or the like so that it can be shifted longitudinally, or the armature itself may be capable of being adjusted longitudinally, but the preferred method is to journal one of the two meshing wheels in a bracket indicated in dot and dash lines at 7, which can be swung about the axis of the other wheel and secured in any desired position.

As one of the objects of the invention is to obtain an absolutely dependable conversion of oscillating into rotational movement using rough apparatus, e. g. stamped wheels the meshing teeth of which may have considerable backlash, such an adjustment is necessary to enable the pallet and teeth to be brought into such relation as to ensure the step-by-step forward movement and prevent an absolute lock against backward movement. One or both of the gear wheels 5, 6 may also be subject to the action of a spring brake 8 or equivalent steadying device.

If the reciprocating element comprises the armature of an electromagnet, it may be moved both to and fro by electrical means, but it would usually be spring-urged in one direction as shown in the drawing, and any suitable means may be provided for adjusting the tension of the spring.

Having thus described the nature of the said invention and the best means I know of carrying the same into practical effect, I claim:—

1. Mechanism for converting oscillating movement into a step-by-step rotational movement, comprising in combination an oscillating element, an electro-magnet associated with said oscillating element to move it in one direction, a spring associated with said element for moving it in the opposite direction, a pair of toothed wheels permanently in mesh with each other, and a pallet consisting of a single pin or tooth carried by the oscillating element and engaging alternately with the teeth of the said wheels to rotate the later through a definite angle at each swing of the oscillating element.

2. A mechanism according to claim 1, wherein the pallet consists of a pin which is of substantially cylindrical shape upon its operating face and of flat shape on the reverse face.

3. A mechanism according to claim 1, comprising means for adjusting the relation of the pallet with respect to the teeth of the meshing wheels consisting of a bracket in which one of the two said wheels is journaled and which is mounted to swing about the axis of the other wheel.

In testimony whereof I have signed my name to this specification.

CHARLES EDMOND PRINCE.